(12) United States Patent
Plainecassagne et al.

(10) Patent No.: US 8,762,739 B2
(45) Date of Patent: Jun. 24, 2014

(54) MICROCONTROLLER CONFIGURED FOR EXTERNAL MEMORY DECRYPTION

(75) Inventors: Eric Plainecassagne, Versailles (FR); Guillaume Descamps, Paris (FR)

(73) Assignee: Itron, Inc., Liberty Lake, WA (US)

( * ) Notice: Subject to any disclaimer, the term of this patent is extended or adjusted under 35 U.S.C. 154(b) by 69 days.

(21) Appl. No.: 13/475,789

(22) Filed: May 18, 2012

(65) Prior Publication Data

US 2013/0275766 A1      Oct. 17, 2013

Related U.S. Application Data

(63) Continuation of application No. PCT/US2012/037309, filed on May 10, 2012.

(30) Foreign Application Priority Data

Apr. 17, 2012   (EP) ..................................... 12164501

(51) Int. Cl.
  *G06F 21/00*   (2013.01)
(52) U.S. Cl.
  USPC .............. 713/189; 713/187; 380/29; 380/259
(58) Field of Classification Search
  None
  See application file for complete search history.

(56) References Cited

U.S. PATENT DOCUMENTS

| 4,847,902 A * | 7/1989 | Hampson ...................... 713/190 |
| 2008/0089390 A1 | 4/2008 | Picard |
| 2009/0006864 A1* | 1/2009 | Hashimoto et al. ........... 713/190 |
| 2010/0250935 A1* | 9/2010 | Ginter et al. .................. 713/168 |

| 2011/0016517 A1 | 1/2011 | Kasahara et al. |
| 2011/0131470 A1 | 6/2011 | Kambayashi et al. |
| 2012/0036355 A1 | 2/2012 | Jang et al. |
| 2012/0069997 A1 | 3/2012 | Kawabata et al. |

FOREIGN PATENT DOCUMENTS

| EP | 1126356 | 8/2001 |
| EP | 1542112 | 6/2005 |

OTHER PUBLICATIONS

The PCT Search Report mailed Mar. 14, 2013 for PCT application No. PCT/US12/37309, 9 pages.
The Extended European Search Report mailed Sep. 7, 2012 for European patent application No. 12164501.4, 6 pages.
Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.

* cited by examiner

*Primary Examiner* — Shewaye Gelagay
(74) *Attorney, Agent, or Firm* — Lee & Hayes, PLLC

(57) ABSTRACT

In an advanced metering infrastructure environment, software program statements and/or data may be encrypted. A microcontroller unit may include a first cache configured to store a block of encrypted data obtained from an external memory device. A decryption engine may decrypt the block of encrypted data for storage in a second cache. An address alignment module may be configured to receive input from a program counter and to calculate an offset pointer. The offset pointer may indicate a particular word in the block of decrypted data within the second cache for transmission to an instruction register for use by an application program. An address generator may be configured to receive input from the address alignment module and to indicate a block of data in the external memory device to be loaded into the first cache, to thereby replace the encrypted data sent to the decryption engine.

19 Claims, 3 Drawing Sheets

MICROCONTROLLER CONFIGURED FOR EXTERNAL MEMORY DECRYPTION

CROSS REFERENCE TO RELATED APPLICATIONS

This application is a continuation of, and claims priority to, PCT International Application No. PCT/US12/37309, filed May 10, 2012, which claims foreign priority to European Patent Application No. EP 12164501.4, filed Apr. 17, 2012, and entitled "Microcontroller Configured for External Memory Decryption," which is incorporated herein by reference.

BACKGROUND

An advanced metering infrastructure (AMI) node may be associated with a device for metering a consumable resource, such as electricity, natural gas or water. Such nodes may be organized as an autonomous routing area (ARA), having a tree structure that may be headed by a root node and/or router node. Within each node, a number of sensors, meters or other devices may provide data to a processing unit, memory and/or an application specific integrated circuit (ASIC). Application(s) operating on the node may process data received as input, and relay it up the network.

Such data, and the executable code that forms the application(s), may be valuable. For example, data may represent consumption quantities of electricity, natural gas or other utility, and integrity of the data may be important for financial reasons. Additionally, the executable code may include propriety technology. Unfortunately, the nodes in an ARA may be vulnerable to tampering, and the data may be vulnerable to unauthorized viewing or copying. Additionally, the executable code of the application(s) (e.g., program statements) may be vulnerable to copying, decompiling and reverse engineering, which can reveal information on the operation and functionality of individual nodes and/or the entire network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
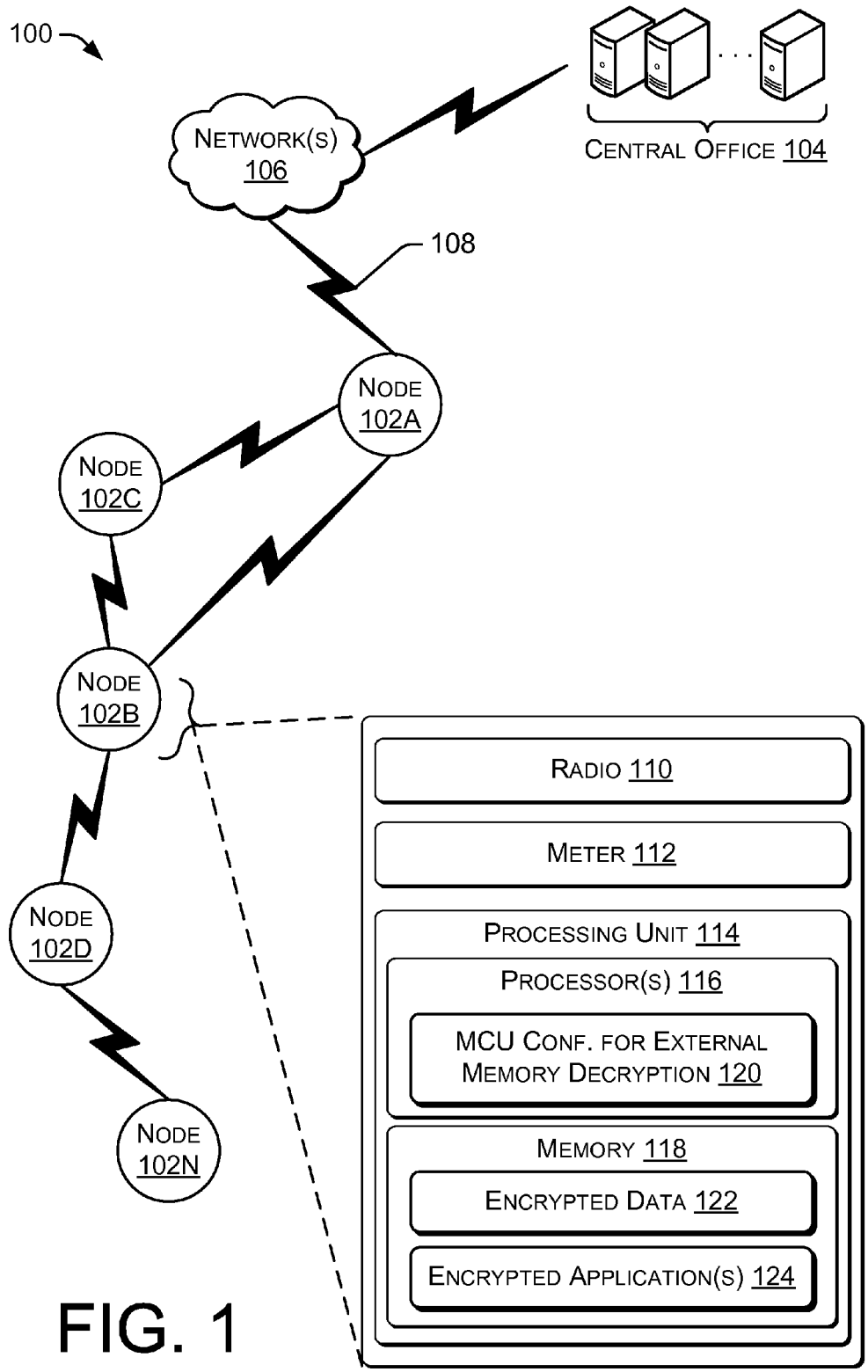
FIG. 1 is a diagram showing an example network having a plurality of nodes, some detail of one example node, a connection to a further network such as the Internet, and a central office.

Advanced encryption standard (AES) and other encryption techniques represent significant advances in data security. For example, blocks of 128 bits may be encrypted using a symmetric key, resulting in strong encryption. Using such encryption, data may be secured, even in environments in which it is not possible to secure and control the memory devices that contain the data.

In an advanced metering infrastructure (AMI), nodes may contain data related to the consumption of electricity, natural gas, water and/or other consumable resources. The nodes may include memory devices which control records of the consumption. Such records have considerable financial value, since customers are billed based on the amounts consumed. Accordingly, encryption is useful to prevent tampering.

However, existing microcontrollers are configured to execute code and to use data that is not encrypted. In cases where encrypted executable code and/or encrypted data are used, considerable overhead is introduced, which slows down program execution. Also, the decrypted code and data is put at risk during the periods that it remains decrypted. The below discussion includes several representative examples that provide techniques for configuring a microcontroller for external memory encryption.

An example illustrating some of the techniques discussed herein—not to be considered a full or comprehensive discussion—may assist the reader. In an AMI environment, a meter may be configured to generate encrypted data representing consumption of a resource and to record the encrypted data in a memory device located external to a microcontroller unit. The meter may utilize an application (e.g., a software program) that includes executable statements that are stored in an encrypted form on the memory. Within the microcontroller unit (and/or microprocessor, processor, etc.) a first cache may be configured to store a block of encrypted data obtained from the memory device. The data may represent any encrypted information, such as consumption records or encrypted program statements. Also within the microcontroller unit, a decryption engine may be configured to obtain and decrypt the block of encrypted data from the first cache. A second cache, also located within the microcontroller unit, may be configured to receive the block of decrypted data from the decryption engine. An address alignment module may be configured to receive input from a program counter and to calculate an offset pointer. The offset pointer may indicate a particular word in the block of decrypted data within the second cache for transmission to an instruction register for use by an application program. An address generator may be configured to receive input from the address alignment module and to indicate a block of memory in the memory device to be loaded into the first cache, to thereby replacing the encrypted data sent to the decryption engine.

The discussion herein includes several sections. The discussion, drawings and each section are intended to be examples of techniques and/or structures, but are not intended to indicate elements which must be used and/or performed. More particularly, this entire description is intended to illustrate components and techniques that may be utilized in a microcontroller configured for external memory decryption, but not components or techniques which are necessarily required. The discussion begins with a section entitled "Example Network," which describes one environment that may implement the techniques described herein. This section depicts and describes an example of an ARA that may include the techniques for use with encrypted data on a memory device that is external to a microcontroller and/or processor. Next, a section entitled "Example Microcontroller Unit" illustrates and describes an example of a microcontroller unit, and also shows its relationship to an external memory device. This section provides example structures that perform representative functionality, including decrypting data obtained from the external memory device. A third section, entitled "Example Methods," discusses aspects of methods operational in devices including processors, memory devices, application specific integrated circuits (ASICs), etc. In particular, the example methods may be applied to any of the techniques discussed herein. Next, a section entitled "Example Methods of External Memory Decryption" illustrates and describes aspects that may be used to read, decrypt and manage encrypted data on a memory device that is external to the microcontroller. Finally, the discussion ends with a brief conclusion.

This brief introduction, including section titles and corresponding summaries, is provided for the reader's convenience and is not intended to describe and/or limit the scope of the claims or any section of this disclosure.

Example Network

FIG. 1 is a diagram showing an example network 100, which may be an ARA or other network. FIG. 1 shows a plurality of nodes 102, including a root or router node 102A, which may be connected to a central office 104 by a network 106 such as the Internet. Within the network, nodes may communicate by means of radio RF links 108, power line communication (i.e., a signal superimposed over current flowing in an electrical power transmission grid) or other medium. The example network 100 is provided as a specific instance to illustrate more general concepts of the use and management of encrypted data in a network environment, and not to indicate required and/or necessary elements. In particular, the example network 100 will be used to illustrate examples of nodes utilizing microcontrollers and external memory devices. In particular, the microcontrollers may execute software code associated with applications operating on the nodes that may utilize encrypted data and/or encrypted program statements.

The network architecture 100 may be configured as a smart grid, such as an AMI network including a number of utility meters having wireless communication capabilities. The utility meters may measure consumption of electricity, natural gas, water or other consumable resources. The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may be distributed amongst multiple locations and/or may be eliminated entirely (e.g., in the case of a highly decentralized distributed computing platform).

The network(s) 106 may comprise a wireless or a wired network, or a combination thereof; such as the Internet. The network 106 may be a collection of discrete and/or interconnected networks, which may function as a single large network.

The network architecture 100 may include a plurality of nodes 102A, 102B, 102C, 102D, . . . 102N (collectively referred to as nodes 102) communicatively coupled to each other via direct communication RF signals, power line communication (PLC) links, or other types of transmissions. Some of the nodes may be associated with utility meters. In this example, N represents an example number of nodes in an ARA, which may be configured as a wide area network (WAN), metropolitan area network (MAN), local area network (LAN), neighborhood area network (NAN), personal area network (PAN), a combination of the foregoing, or the like.

The node 102A may be considered to be a "root," "root node," "field area router," or similar, and may be configured to connect the ARA to servers within the central office 104 by way of a back-haul network, such as the network 106. The nodes 102 may communicate by means of signals 108, which facilitate both upstream and downstream transfer of data, information, reports, queries and packets, etc.

Detail of the node 102B includes a radio 110, configured for communication by means of RF signals 108. The radio 110 may comprise a RF transceiver configured to transmit and/or receive RF signals via one or more of a plurality of channels/frequencies. In one example of a wireless implementation, the node 102 may include a single radio 110 configured to send and receive data on multiple different channels, such as a control channel and multiple data channels on each communication link 108. The radio 110 may also be configured to implement a plurality of different modulation techniques, data rates, protocols, signal strengths, and/or power levels. Additionally, the radio may be configured to sequentially tune a plurality of different frequencies, each for a short period of time, in a "frequency hopping" scheme. In other implementations, each of the nodes may be configured for wired communication. By way of example and not limitation, wired communications may include power line communications (PCL) or other wired communication network technologies, such as Ethernet. The architecture of the network 100 may represent a heterogeneous network of nodes, in that the nodes 102 may include different types of nodes (e.g., smart meters, cellular relays, sensors, etc.), different generations or models of nodes, and/or nodes that otherwise are capable transmitting on different channels and using different modulation techniques, data rates, protocols, signal strengths, and/or power levels.

A meter 112 may be an electric meter, a natural gas meter, a water meter or other meter. The meter 112 may operate in cooperation with one or more applications, and may create data in encrypted or non-encrypted states. In one example, a processing unit or microcontroller may provide a control and data-exchange interface with the meter 112. The meter may provide encrypted data to the application, or the application may encrypt data received from the meter. The encrypted data may be stored in an external memory (i.e., a memory "external" to, or not part of, the microcontroller on which the software application operates).

A processing unit 114 may include one or more processors 116 communicatively coupled to memory 118. The processor(s) 116 may execute, and the memory 118 may contain, various software statements, software modules, procedures, managers, algorithms, etc. Such functional blocks may be configured in software and/or firmware, and may be executable by the processor(s) 116. In alternative embodiments, any or all of the processor(s) 116, memory 118 and/or software operable on the processor(s) and memory may be implemented in whole or in part by hardware. Examples of hardware include a microcontroller or other digital device, such as an application specific integrated circuit (ASIC) or other device configured to execute the described functions.

In one example, one, several or all of the processor(s) 116 may be microcontroller unit(s) (MCU) 120 configured for external memory decryption. The MCU 120 may be configured to read encrypted data 122 or encrypted software program statements of one or more encrypted applications 124. In the example, the MCU 120 decrypts the data 122 and/or program statements of the application(s) 124 in real time and/or "on the fly." Thus, the MCU 120 is able to execute decrypted program statements and/or utilize decrypted data. In one example, the program statements may be associated with a software application that may interface with the meter 112. In such an example, blocks of data representing encrypted versions of the program statements are decrypted, and the decrypted statements executed, by the MCU 120 configured for external memory decryption.

The memory 118, while shown as a monolithic entity, may also be configured as a plurality of similarly and/or differently configured devices, such as read-only memory, writable memory, persistent or non-persistent memory, etc. The memory 118 may be configured to store one or more software and/or firmware modules, which are executable by the processor(s) 116 to implement various functions. The memory 118 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented according to any technology or techniques for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

For purposes herein, a computer-readable media may include all or part of an application specific integrated circuit (ASIC) or other hardware device. Such a hardware device may be configured to include other functionality, including functions performed in a bandwidth management in an AMI. Accordingly, within such an integrated circuit, one or more processors are configured with executable instructions, which may be defined by logic, transistors or other components, or on-board memory.

In the illustrated example, memory 118 includes encrypted data 122 and a one or more applications 124, which may be defined by processor-executable instructions executable by actions of the processor(s) 116 and/or the MCU 120. Accordingly, the application(s) 124 may be considered to be software, subroutines, programs, etc. Alternatively, the processor 116 and/or 120, memory 118 and/or applications 124 may be defined by operation of one or more hardware devices such as ASICs.

Example Microcontroller Unit

Figure 2:
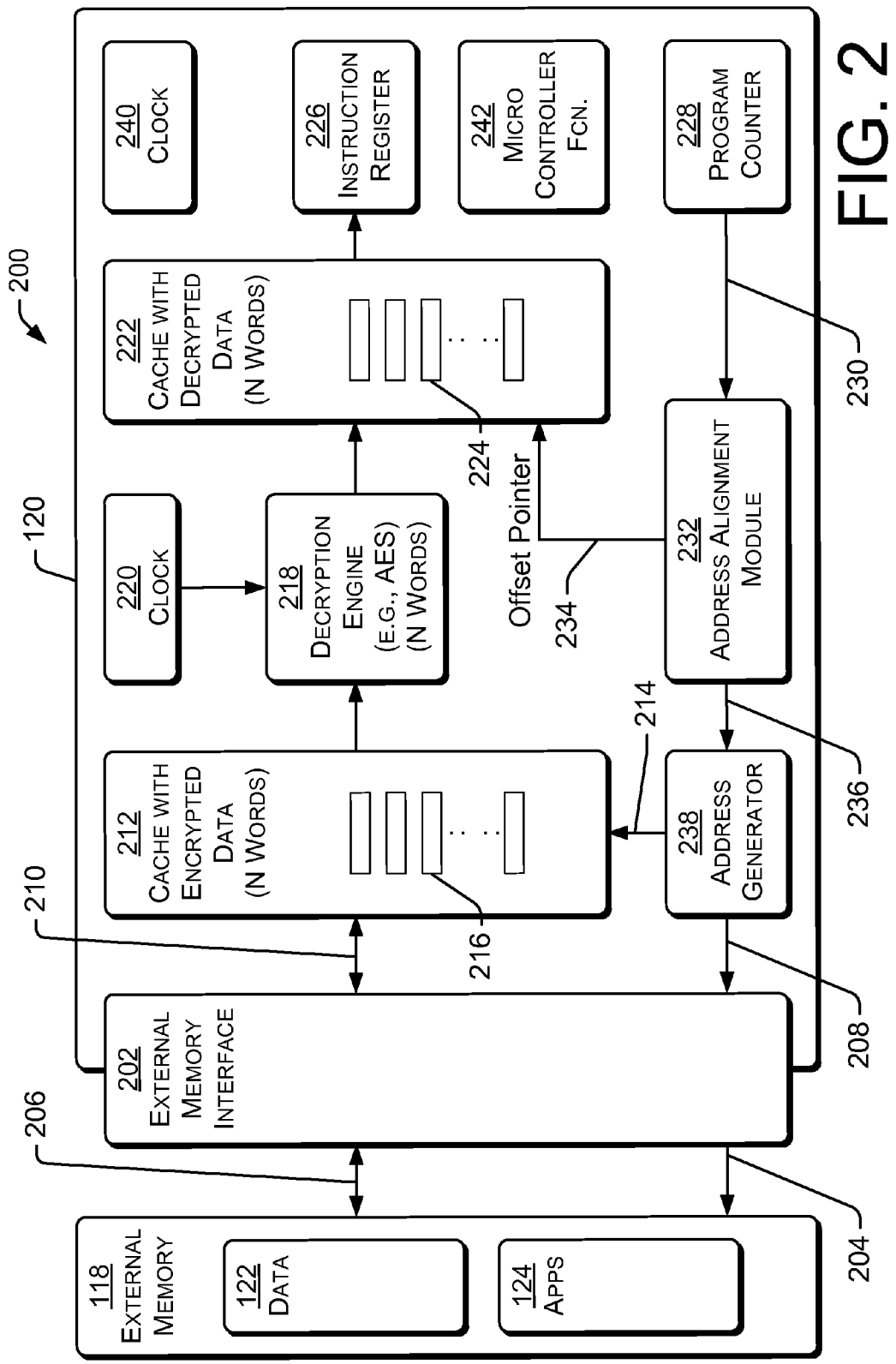
FIG. 2 is a schematic diagram of an example microcontroller unit configured for decryption of data contained in an external memory device.

FIG. 2 is a schematic diagram of an example 200 of an arrangement of a microcontroller unit (MCU) 120 and an external memory device 118. The MCU 120 may be configured for decryption of data contained in the external memory device 118. The data may include information, software application program statements, and the like.

A memory device 118 is external to the MCU 120, and is therefore inherently more vulnerable to attack by those who would steal its data than if the memory device were completely enclosed within the MCU 120. However, the external memory configuration allows the memory device 118 to be much less expensive, and also allows it to be upgraded and/or replaced more easily. To protect against attack, one or both of the data 122 and software program statements (e.g., software commands) of the application 124 may be encrypted. Accordingly, while the memory device 118 is external to the MCU 120, the data and application(s) contained within the device may be protected by encryption.

An external memory interface 202 is configured to connect to an address bus 204 and a data bus 206, and to thereby interface with the external memory device 118. In a second example, the external memory could be connected to the microcontroller unit 120 by a serial link, as opposed to a parallel bus. Either configuration could allow use of the same decryption mechanism. The external memory interface 202 receives an address input 208, which controls the address output 204. A data bus 210 transfers data obtained from the external memory device 118 to a cache memory 212.

The cache memory 212 may be configured to hold a block of encrypted data read from the external memory 202. The block of data may be read over a data bus 210. The data bus may be read at a time indicated by an input 214, which may be controlled by an address generator. In one example, the data read into the cache 212 is stored in memory locations or registers 216. Collectively, the memory locations 216 may be configured to contain one block of data. The block of data may be 128 bits, 256 bits or other quantity. In one example, a 128-bit block is used, which matches the 128-bit block of data used by AES encryption. In such an example, the registers 216 may organize the 128-bit block as N words, such as 4 words of 32-bit length. Such an example may utilize an electronic codebook (ECB), wherein message may be divided into blocks, and each block may be encrypted separately. Alternatively, non-ECB encryption techniques may be used, which may provide better security.

The cache memory device 212 may be configured to provide the block of data to a decryption engine 218. The decryption engine 218 may be a special purpose hardware device or a general purpose device configured to operate decryption software. To obtain higher throughput, a single purpose hardware device configured to decrypt AES-encrypted data is used. A symmetric key may be built into the device 218 or otherwise provided to it. In the example of FIG. 2, an external clock 220 may be used to clock the decryption engine 218, although an internal clock could alternatively be used.

Output from the decryption engine may be transferred to a second cache 222. The second cache 222 may be configured to contain a block of decrypted data organized as N words in a plurality of registers 224. In one example, the registers 224 organize the decrypted block of data as 4 words of 32-bit length.

A program counter 228 increments to a next or appropriate address, the contents of which indicate an instruction to be read into the instruction register 226. The program counter 228 may be controlled by an operating system or other device. A signal 230 from the program counter 228 may be received by the address alignment module 232. The address alignment module 232 may calculate an offset pointer 234, wherein the offset pointer indicates which of the registers 224 of the second cache 222 having decrypted data should be sent to the instruction register 226.

In one example, the program counter 228 includes an address of the external memory 118 having the desired program instruction. However, data was previously read from the external memory 118, stored in the first cache 212, decrypted by the decryption engine 218 and then stored in the second cache 222 in decrypted form. Accordingly, a decrypted form of the program instruction indicated by the program counter 228 is contained in one of the registers 224 of the second cache memory 222. The address alignment module 232, using the offset pointer 234, indicates the appropriate register.

An address generator 238 may receive an input 236 from the address alignment module 232. The input may indicate an address, which the address generator 238 may translate into an address of a block of data to fetch from the external memory 118 for storage in the first cache 212. The address generator 238 may place an address on the address bus 208/204, to select desired data from the external memory 118. In one example, the address generator 238 is configured to adapt to address buses of different widths, such as by having sufficient address space to accommodate varying memory device sizes. When the address is on the bus, an output 214 allows the address generator 238 to notify the first cache when it is time to read the data bus 210/206.

Optionally, the functionality of the address alignment module 232 and the address generator 238 may be combined. In such a configuration, a unified address alignment and generator module could be configured to: provide an offset pointer 234 to the second cache memory 222; to generate an output 208 indicating an address of a block of memory to be fetched from external memory; and to provide a signal 214 to the first cache 212 to receive data on the data bus 210.

A clock 240 may be used to provide clock signal(s) to the instruction register 226, the program counter 228 and other microcontroller functionality 242. The microcontroller functionality 242 may include a plurality of functions that are present in known microcontrollers, and which are not described herein. In one example, the clock 220 driving the decryption engine 218 may be of a higher frequency than the clock 240, although the exact design parameters can vary depending on the implementation.

Example Methods

Figure 3:
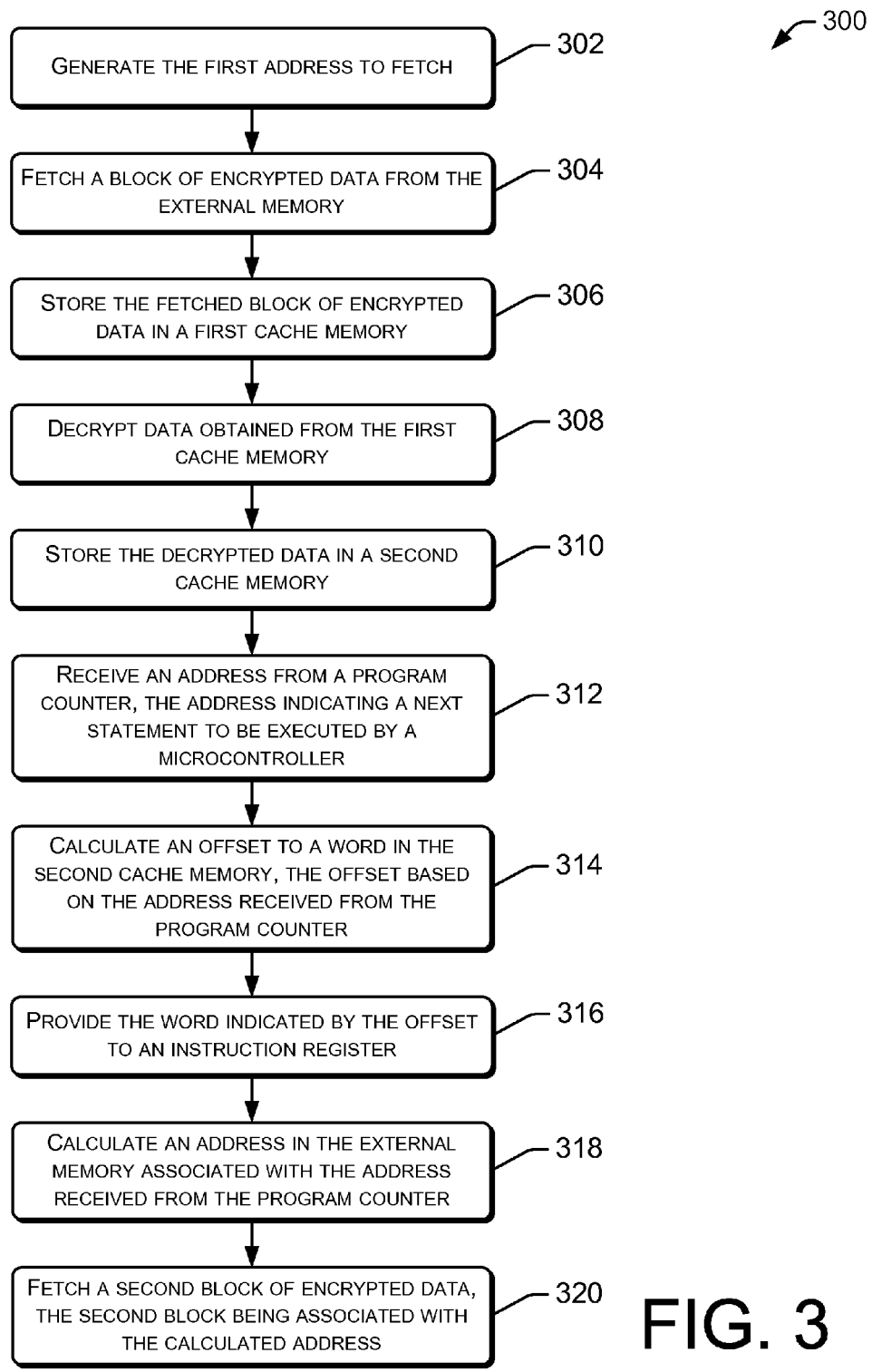
FIG. 3 is a flow diagram illustrating an example method by which a microcontroller configured for external memory decryption may be operated.

The example methods of FIG. 3 may be implemented at least in part by the configurations of FIGS. 1 and 2. However, FIG. 3 contains general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof. In the context of software, the operations represent computer-executable instructions stored on one or more computer-readable storage media that, when executed by one or more processors, perform the recited operations. Such storage media, processors and computer-readable instructions can be located within a MCU (e.g., MCU 120 of FIGS. 1 and 2) according to a desired design or implementation. The storage media seen in FIGS. 1 and 2 is representative of storage media generally, both removable and non-removable, and of any technology. Thus, the recited operations represent actions, such as those described in FIG. 3, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method. The above discussion may apply to other methods described herein.

Example Methods of External Memory Decryption

FIG. 3 is a flow diagram illustrating an example method 300 by which a microcontroller unit (MCU) may operate to provide decryption of data contained in external memory. At operation 302, a first address in memory whose contents are to be fetched is generated. In the example of FIG. 2, the program counter 228 may give an address 230 to the address alignment module 232. The address alignment module 232 may generate an address 236, which is sent to the address generator 238.

At operation 304, a block of encrypted data is fetched from an external memory device. The fetching may be performed in response to completion of the decrypting of the data, incrementing the offset pointer to the last word in the second cache, or other timing event. In the context of example of FIG. 2 a 128-bit block, sized to be compatible with AES encryption, is fetched from external memory device 118. The block of data may comprise encrypted computer software program statements or data information. The block may be fetched through operation of an external memory interface 202. The external memory interface may be attached to the address bus 204 and a data bus 206. Address(es) are put on to the address bus, and corresponding data is read off the data bus.

At operation 306, the fetched block of encrypted data is stored in a first cache memory. In the context of example of FIG. 2, the N words of the block of encrypted data may be stored in N registers 216 in the first cache 212. In one example, the 128-bit block is stored in 4 registers, each of 32-bit length.

At operation 308, data obtained from the first cache memory is decrypted. In the context of example of FIG. 2, the data from the first cache 212 is transferred to the decryption engine 218. The decryption engine 218 may be configured to decrypt a 128-bit block of encrypted data using a key (e.g., a symmetric key) built into the engine. The decryption engine 218 may be configured as a fast-operating hardware device, which may use the fastest clock 220 available in the MCU. The clock 220 may provide a clock signal at the decryption engine that is faster than a clock signal provided to the program counter or other areas of the microcontroller unit.

At operation 310, the decrypted data is stored in a second cache memory. In the context of example of FIG. 2, decrypted data is output from the decryption engine 218 for storage in the second cache memory 222. The address alignment module, the address generator and/or another device may signal the decryption engine to overwrite the second cache with newly decrypted data. The overwriting of the second cache may reset the offset pointer 234. In the example shown, a decrypted 128-bit block of data is stored as 4 words of 32-bit length in registers 224. However, other data block and word length sizes are possible, depending on the encryption technology used and the design of the decryption engine.

At operation 312, an address from a program counter is received. The address indicates a next statement to be executed by, and/or fetched for, the microcontroller. In the context of example of FIG. 2, the program counter 228 may be incremented by an operating system, application of other device and/or object. Output 230 of the program counter 228 is transferred to an address alignment module 232.

At operation 314, an offset to a word (e.g. a data element) in the second cache is calculated, wherein the word represents the instruction or data indicated by the address provided by the program counter. The calculating may include incrementing an offset pointer to indicate the word contained within the second cache, wherein the incrementing is based on action by the program counter. In the context of example of FIG. 2, the address alignment module 232 processes the address received from the program counter 228. In particular, the address alignment module 232 maps the received address from a location in the external memory 118 to a register 224 in the second cache 222. Accordingly, the register 224 located in the second cache 222 contains a decrypted version of the address in the external memory 118, and is therefore usable by the MCU. The particular register 224 may be indicated by an offset or offset pointer 234. Thus, the data in the register indicated by the offset pointer 234 is a decrypted version of the data indicated by the program counter 228, which originally resided in the external memory 118. That is, the output 230 of the program counter 228 is an address to a location in external memory 118 that has been decrypted and moved to a register 224 in the second cache 222, pointed to by the offset pointer 234.

At operation 316, the data word indicated by the offset is provided to the instruction register. Accordingly, the data indicated by the address provided by the program counter, in a decrypted form found in the second cache, is provided to the program counter. In the context of example of FIG. 2, the appropriate register 224 in the second cache 222 is copied to the instruction register 226.

At operation 318, an address in the external memory is calculated for use in fetching an additional block of data. In the context of example of FIG. 2, the address alignment module 232 provides an address in output 236 to the address generator 238. The address generator 238 calculates an address to a next block of data to be fetched, based on the received address. Thus, the calculation of the address in the external memory 118 may be associated with an address received from the program counter 228 may include determining a block of data in the external memory that follows a block of data in the external memory that was most recently fetched.

At operation 320, a second block of encrypted data is fetched from the external memory. The second block of memory is associated with the address calculated at operation 316. In the context of example of FIG. 2, the address generator 208 provides appropriate address(es) to the external memory interface 202, and may provide a signal 214 to the first cache memory 212 to receive data from the external memory device 118. In one example, the second block may be fetched after some timing event, such as when the offset pointer 234 has pointed to a last word or register 224 in the second cache 222. In a further example, the second block may be fetched after the offset pointer has pointed to each register in the second cache. The offset pointer may then be reset to point at a first register, such as in response to an increment of the offset pointer when the offset point is pointing to the last register.

Note that a number of operations may be performed in parallel. As one example for purposes of illustration only, fetching the block of encrypted data (operation 302, 318), decrypting the data obtained from the first cache memory (operation 306) and providing the word indicated by the offset (operation 314) may all be performed simultaneously.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A node in a network, comprising:
   a meter configured to measure consumption of a resource comprising electricity, gas or water, and configured to generate encrypted data representing consumption of the resource and to record the encrypted data in a memory device located externally to a microcontroller unit;
   a first cache, located within the microcontroller unit, and configured to store a block of the encrypted data obtained from the memory device;
   a decryption engine, located within the microcontroller unit, and configured to obtain the block of the encrypted data from the first cache and to decrypt the block of the encrypted data, thereby producing a block of decrypted data;
   a second cache, located within the microcontroller unit, and configured to receive the block of decrypted data from the decryption engine;
   an address alignment module configured to receive input from a program counter within the microcontroller unit and to calculate an offset pointer to a particular word in the block of decrypted data within the second cache;
   an address generator configured to receive input from the address alignment module and to indicate a block of memory in the memory device to be loaded into the first cache; and
   an application having program statements configured for operation on the microcontroller unit, the program statements being stored on the external memory in encrypted form and being executed in decrypted form in an order indicated by the offset pointer.

2. The node of claim 1, wherein the address alignment module calculates the offset pointer to the particular word based on a mapping of an address in the memory device external to the microcontroller unit to a register in the second cache.

3. A node, comprising:
   a microcontroller;
   a memory device located external to the microcontroller and comprising encrypted data and encrypted software program statements; and
   a meter configured to measure consumption of a resource comprising electricity, gas or water, and configured to generate the encrypted data, wherein the encrypted data represents consumption of the resource;
   wherein the microcontroller comprises:
      a first cache configured to store N words of encrypted data obtained from a memory device external to the processing device;
      a decryption engine configured to obtain the N words of encrypted data from the first cache and to decrypt the N words;
      a second cache, configured to receive the N words of decrypted data from the decryption engine; and
      an address alignment and generator module, configured to:
         receive input from a program counter and to calculate an offset pointer to a particular word of the N words of decrypted data within the second cache; and
         indicate N words of encrypted data in the memory device external to the processing device to be loaded into the first cache.

4. The node of claim 3, wherein the address alignment and generator module translates the input from the program counter, which indicates a word from a particular location in external memory, into an offset to a register in the second cache.

5. The node of claim 3, wherein the address alignment and generator module is additionally configured to:
increment the offset pointer in response to input from the program counter, wherein the offset pointer points to a decrypted word of data for transmission to the instruction register.

6. The node of claim 3, wherein:
calculating the offset pointer includes translating an address, the address originally indicating a location in the memory device external to the processing device, to indicate a register in the second cache; and
indicating N words of encrypted data in the memory device includes mapping an address obtained from the program counter to indicate a block of memory in the external memory device.

7. The node of claim 3, wherein:
the address alignment and generator module signals the decryption engine to overwrite the second cache with newly decrypted data; and
the offset pointer is reset when decrypted data from the decryption engine overwrites the second cache.

8. The node of claim 3, wherein address alignment and generator module is additionally configured to:
adapt address buses of different widths; and
notify the first cache when it is time to read the data bus.

9. The node of claim 3, additionally comprising:
a first clock configured to send a signal to the decryption engine; and
a second clock configured to send a signal to the instruction register and the program counter.

10. The node of claim 3, wherein:
the first cache contains one block of encrypted data;
the decryption engine contains one block of data in the process of decryption; and
the second cache contains one block of decrypted data.

11. A method in a processor of executing encrypted code from an external memory, comprising:
receiving, from a meter, encrypted meter data representing consumption of a resource comprising electricity, gas or water;
recording the encrypted meter data in a memory device located externally to a microcontroller unit;
fetching a first block of encrypted program statements from the external memory;
storing the fetched block of encrypted program statements in a first cache memory;
decrypting one or more encrypted program statements obtained from the first cache memory;
storing the decrypted program statements in a second cache memory;
receiving an address from a program counter, the address indicating a next statement from among the stored decrypted program statements to be executed by a microcontroller;
accessing the encrypted meter data by execution of statements indicated by the program counter;
calculating an offset to a decrypted program statement in the second cache memory, the calculating comprising incrementing an offset pointer;
calculating an address of a second block of program statements in the external memory based at least in part on an address of the first block of program statements; and
fetching the second block of encrypted program statements from the external memory to provide executable statements for execution after a last decrypted program statement in the second cache memory.

12. The method of claim 11, wherein fetching the block of encrypted program statements from the external memory is in response to completing the decrypting of a previous block of encrypted program statements.

13. The method of claim 11, wherein decrypting the program statements comprises decrypting the program statements using a decryption engine configured in hardware for AES decryption.

14. The method of claim 13, wherein decrypting the program statements comprises receiving a clock signal at the decryption engine that is faster than a clock signal provided to the program counter.

15. The method of claim 11, additionally comprising calculating an offset to a word in the second cache memory, the offset based on the address received from the program counter.

16. The method of claim 11, additionally comprising calculating an address in the external memory associated with the address received from the program counter, wherein the calculating comprises determining a block of data in the external memory that follows a block of data in the external memory that was most recently fetched.

17. The method of claim 11, wherein fetching the block of encrypted program statements and decrypting the program statements obtained from the first cache memory are performed simultaneously.

18. The method of claim 11, additionally comprising:
fetching the second block of encrypted program statements from the external memory after the offset pointer has pointed to each register in the second cache memory; and
resetting the offset pointer to point at a first register in response to an increment of the offset pointer when the offset pointer is pointing to the last register.

19. A method of executing encrypted code from an external memory, comprising:
fetching a block of encrypted data from the external memory;
storing the fetched block of encrypted data in a first cache memory;
decrypting data obtained from the first cache memory, wherein decrypting the data comprises decrypting the data using a decryption engine configured in hardware for AES decryption, and wherein decrypting the data comprises receiving a clock signal at the decryption engine that is faster than a clock signal provided to a program counter;
storing the decrypted data in a second cache memory;
receiving an address from the program counter, the address indicating a next statement to be executed by a microcontroller;
calculating an offset to a word in the second cache memory, the offset based on the address received from the program counter;
providing the word indicated by the offset to an instruction register;
calculating an address in the external memory associated with the address received from the program counter; and
fetching a second block of encrypted data from the external memory, the second block of encrypted data being associated with the calculated address.

* * * * *